US008657594B2

(12) United States Patent
Atagi et al.

(10) Patent No.: US 8,657,594 B2
(45) Date of Patent: Feb. 25, 2014

(54) PUNCH OF COMPRESSION MOLDING MACHINE

(75) Inventors: Kouichi Atagi, Kyoto (JP); Fumiharu Ikai, Kyoto (JP)

(73) Assignee: Kikusui Seisakusho Ltd., Kyoto-Shi, Kyoto (JP)

( * ) Notice: Subject to any disclaimer, the term of this patent is extended or adjusted under 35 U.S.C. 154(b) by 302 days.

(21) Appl. No.: 13/317,166

(22) Filed: Oct. 12, 2011

(65) Prior Publication Data

US 2012/0121751 A1 May 17, 2012

(30) Foreign Application Priority Data

Nov. 17, 2010 (JP) ................................ P2010-256675

(51) Int. Cl.
*B26D 7/26* (2006.01)
*B29C 43/32* (2006.01)

(52) U.S. Cl.
USPC ....... 425/78; 425/345; 83/698.11; 83/698.91; 83/684

(58) Field of Classification Search
USPC ......... 425/78, 344–345, 352–355; 83/698.11, 83/686, 687, 698.91, 684, 699.31–699.61, 83/691, 698.71
See application file for complete search history.

(56) References Cited

U.S. PATENT DOCUMENTS

| | | | | |
|---|---|---|---|---|
| 2,991,601 | A * | 7/1961 | Glatter et al. | 264/5 |
| 5,056,391 | A * | 10/1991 | Stewart | 83/139 |
| 6,830,442 | B2 * | 12/2004 | Cecil | 425/345 |
| 7,033,156 | B2 * | 4/2006 | Gakovic | 425/78 |
| 8,490,529 | B2 * | 7/2013 | Meissner et al. | 83/698.11 |

FOREIGN PATENT DOCUMENTS

| | | |
|---|---|---|
| JP | 62-034995 | 3/1987 |

* cited by examiner

*Primary Examiner* — Richard Crispino
*Assistant Examiner* — Thukhanh Nguyen
(74) *Attorney, Agent, or Firm* — McGinn IP Law Group, PLLC

(57) ABSTRACT

A punch of a compression molding machine is configured to be assembled with no use of any tool and achieves reduction in time necessary for the assembling process. The punch includes a punch tip member, a holder provided, at a distal end thereof, with a projection projecting radially outward, a cap having a disengagement inhibiting portion engaged with the projection of the holder so as to inhibit the projection from inserted thereinto and extracted therefrom in the axial direction, and a rotation inhibiting member engaged with the holder and the cap attached with the punch tip member so as to inhibit axial rotation of the cap relative to the holder.

6 Claims, 5 Drawing Sheets

PUNCH OF COMPRESSION MOLDING MACHINE

BACKGROUND OF THE INVENTION

1. Field of the Invention

The present invention relates to a punch of a compression molding machine, the punch including a punch tip portion and a holder unit for holding the punch tip portion.

2. Description of the Related Art

There has been conventionally known a configuration of a punch of a compression molding machine, which includes a punch tip portion and a holder unit for holding the punch tip portion. A punch of this type in the compression molding machine is conventionally attached by means of a structure in which a punch tip portion is abutted against a holder unit provided with a male thread, and then the holder unit is screwed with a cap provided with a female thread, so as to fix the holder unit and the punch tip portion to each other (refer to Japanese Unexamined Utility Model Publication No. S62-34995, for example).

However, this structure requires a tool such as a wrench for screwing the cap to the holder unit. Unless the cap is tightly screwed with use of such a tool, the cap might be loosened while the compression molding machine is in operation. Further, it is necessary to control tightening torque so as to be equally tightened regardless of who screws the cap with the holder unit. Moreover, the cap needs to be rotated for several times for screwing. As a result, in a case where this structure is applied to a compression molding machine including a large number of punches, it takes enormous time to assemble a mold tool therefor.

SUMMARY OF THE INVENTION

In view of the above disadvantages, it is an object of the present invention to provide a punch of a compression molding machine, the punch being configured such that a punch tip member can be easily attached to and detached from a holder with no use of any tool, as well as such that burdens and time required for assembling are reduced.

Specifically, the present invention provides a punch of a compression molding machine for compressing and molding a powdery material filled in a die hole, the punch including: a punch tip member inserted into the die hole, for compressing the powdery material in the die hole; a holder having a distal end that is attached with the punch tip member and is provided with at least one projection projecting radially outward, the holder being driven to move forward and backward with respect to the die hole; a cap having a punch tip retaining portion for retaining the punch tip member, an opening allowing the distal end of the holder to be inserted thereinto, a receiving portion allowing the projection of the holder to be inserted thereinto and extracted therefrom in an axial direction, and a disengagement inhibiting portion provided adjacent to the receiving portion in a circumferential direction so as to be engaged with the projection of the holder and to inhibit the projection from being inserted and extracted in the axial direction, the receiving portion and the disengagement inhibiting portion being provided on a peripheral wall of the opening; and a rotation inhibiting member engaged with the holder and the cap attached with the punch tip member so as to inhibit axial rotation of the cap relative to the holder.

In the punch described above, the projection of the holder is abutted against the punch tip member, and the projection of the holder and the receiving portion of the cap are abutted each other in terms of topology. In this state, the cap is attached to the punch tip member and the holder with the opening of the cap facing the punch tip member and the holder. Thereafter, the cap is rotated so that the disengagement inhibiting portion of the cap and the projection of the holder are engaged with each other, whereby the cap can be attached to the holder. In short, the punch tip member can be attached to the distal end of the holder. In the reverse processes, the punch tip member can be detached from the distal end of the holder. Accordingly, the cap can be attached and detached with no use of any tool, and the punch tip member can be easily attached to and detached from the holder. Further, the cap does not need to be rotated more than one time for attaching the punch tip member to the distal end of the holder. As a result, operation time necessary for attaching the punch tip member to the holder can be remarkably reduced, in comparison to a conventional case where the cap needs to be rotated for several times for attaching and detaching the cap.

In particular, in a case where the punch includes three receiving portions of the cap, three disengagement inhibiting portions of the cap, and three projections of the holder, the receiving portions, the disengagement inhibiting portions, and the projections being configured identically with those of claim 1, respectively, and being disposed so as to be apart from one another in the circumferential direction, the cap can be securely attached to the holder.

In an exemplary configuration for reliably inhibiting relative rotation between the holder and the cap, the rotation inhibiting member is engaged with a fitting groove provided in the holder and a rotation inhibiting member fitting concave portion provided in the cap, so as to restrict relative rotation between the cap and the holder.

In a case where the rotation inhibiting member is provided, at a distal end thereof, with a retentive portion for retaining the rotation inhibiting member onto the peripheral wall of the cap from an inner peripheral side, it is possible to effectively prevent disengagement of the rotation inhibiting member from the cap and the holder. Further alternatively, the rotation inhibiting member may be provided with a magnet, so as to be magnetically connected to the holder.

As described above, the present invention can provide a punch of a compression molding machine, the punch being configured such that a punch tip member can be easily attached to and detached from a holder with no use of any tool, as well as such that operation time and burdens required for assembling are reduced.

DETAILED DESCRIPTION OF THE PREFERRED EMBODIMENTS

Described below is an embodiment of the present invention with reference to FIGS. 1 to 9.

Figure 1:
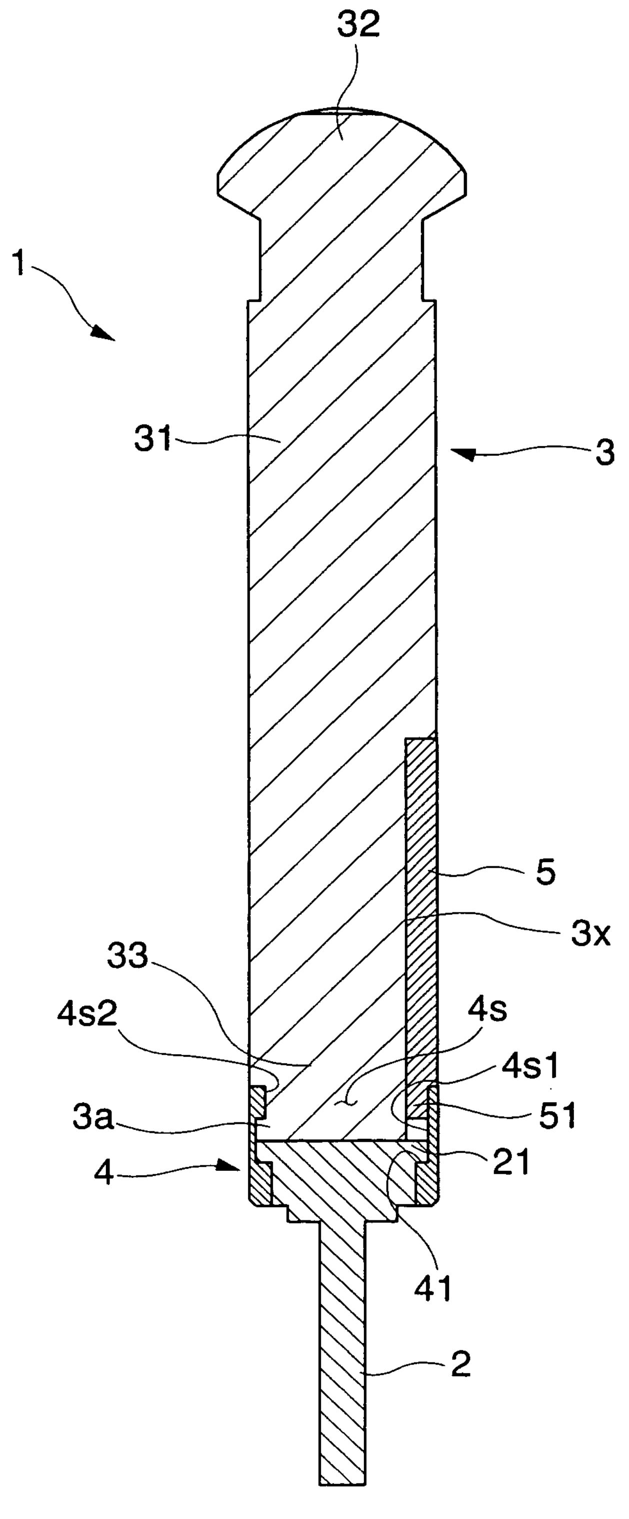
FIG. 1 is a sectional view of a punch according to an embodiment of the present invention, the punch being vertically cut into half.
Figure 2:
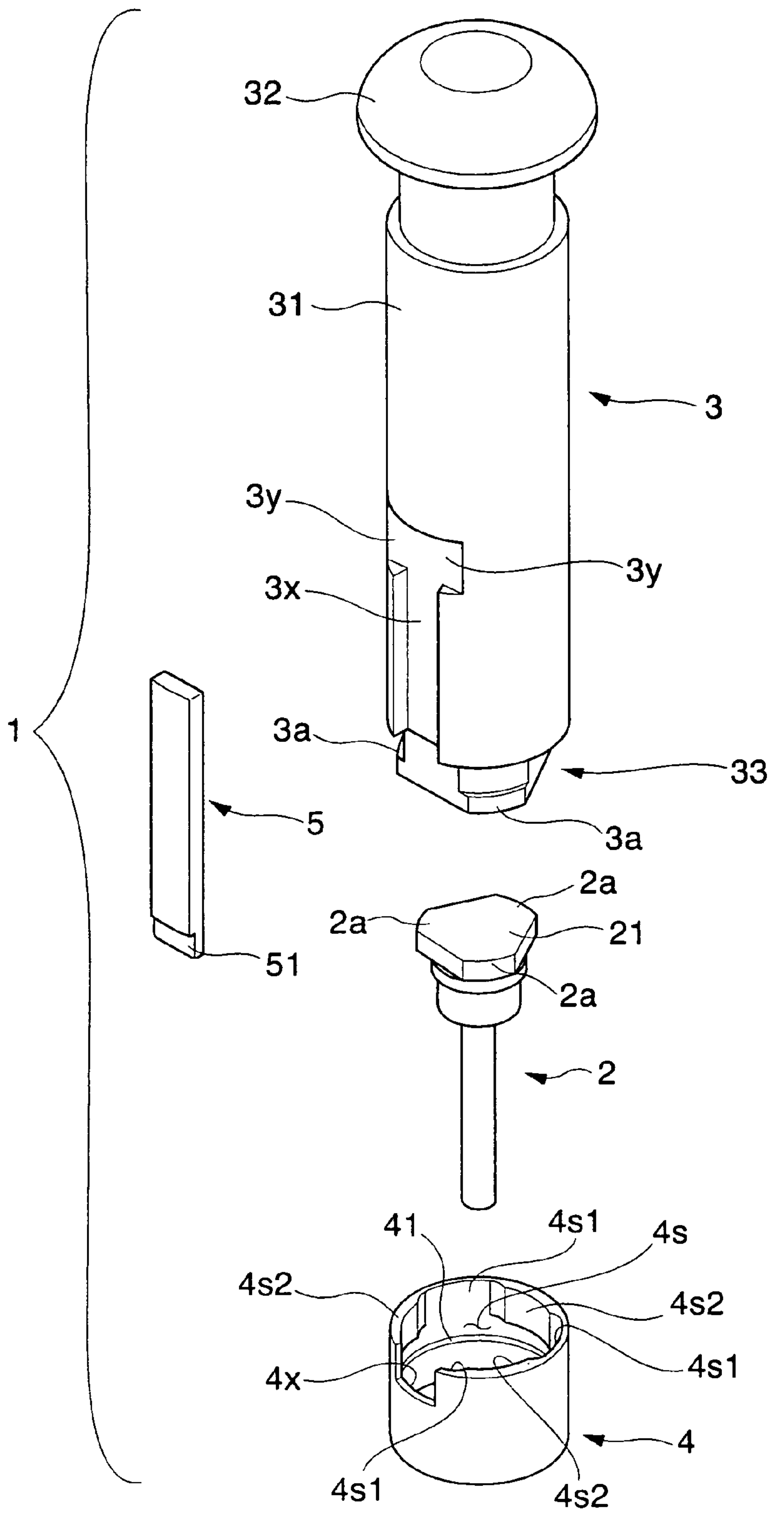
FIG. 2 is an exploded perspective view of the punch according to the embodiment.
Figure 3:
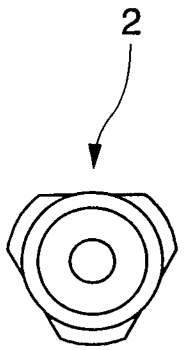
FIG. 3 is a bottom view of a punch tip member according to the embodiment.
Figure 4:
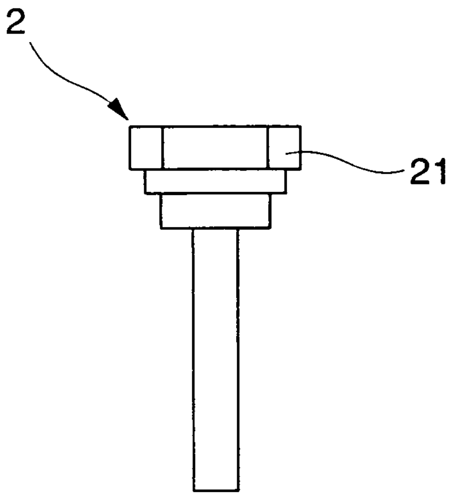
FIG. 4 is a front view of the punch tip member according to the embodiment.
Figure 5:
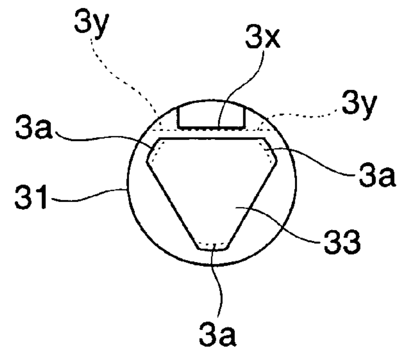
FIG. 5 is a bottom view of a holder according to the embodiment.
Figure 6:
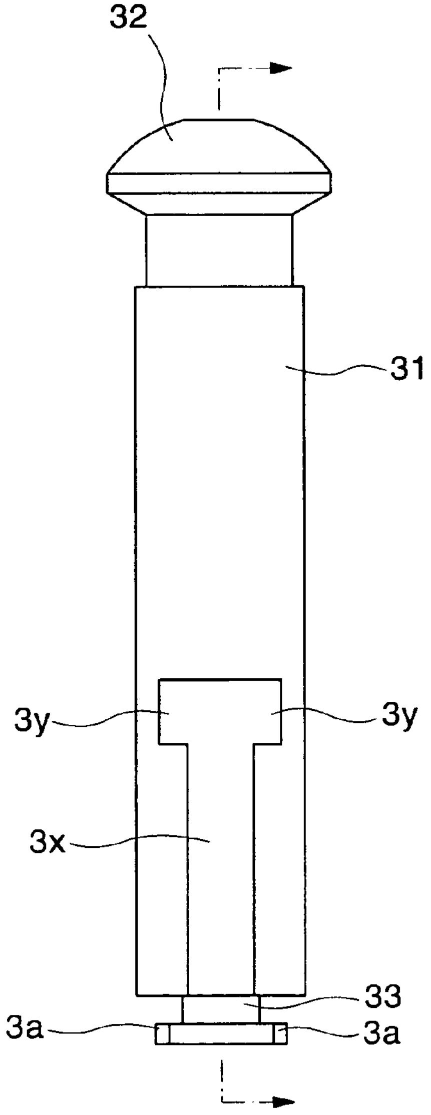
FIG. 6 is a front view of the holder according to the embodiment.
Figure 7:
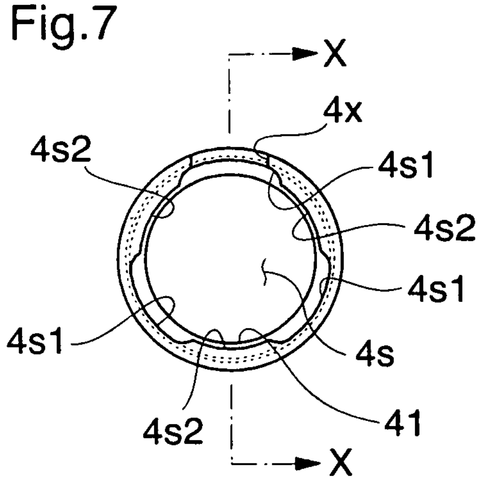
FIG. 7 is a plan view of a cap according to the embodiment.
Figure 8:
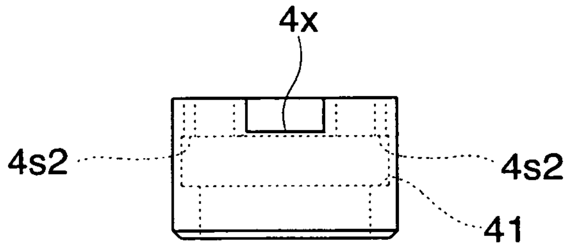
FIG. 8 is a front view of the cap according to the embodiment.
Figure 9:
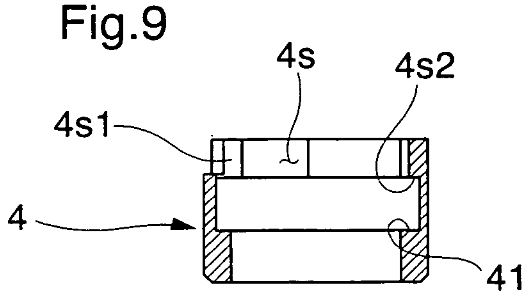
FIG. 9 is a sectional view taken along line x-x indicated in FIG. 7.

As shown in FIGS. 1 and 2, a punch 1 according to the present embodiment is applied to a compression molding machine that compresses and molds a powdery material filled in a die hole. The punch 1 includes a punch tip member 2, a holder 3, a cap 4, and a rotation inhibiting member 5. The punch tip member 2 is inserted into the die hole to compress the powdery material. The holder 3 has a distal end that is attached with the punch tip member 2 and that has a projection 3*a* projecting radially outward. The holder 3 is driven to move forward and backward with respect to the die hole. The cap 4 has a punch tip retaining portion 41 for retaining the punch tip member 2, and an opening 4*s* allowing the distal end of the holder 3 to be inserted thereinto. The opening 4*s* has a peripheral wall provided with a receiving portion 4*s*1 and a disengagement inhibiting portion 4*s*2. The receiving portion 4*s*1 allows the projection 3*a* of the holder 3 to be inserted thereinto and extracted therefrom in the axial direction. The disengagement inhibiting portion 4*s*2 is provided adjacent to the receiving portion 4*s*1 in the circumferential direction and is engaged with the projection 3*a* of the holder 3 so as to inhibit the projection 3*a* from being inserted and extracted in the axial direction. The rotation inhibiting member 5 is engaged with the holder 3 and the cap 4 to which the punch tip member 2 is attached, so as to inhibit the cap 4 from axially rotating relatively to the holder 3.

More specifically, as shown in FIGS. 1 to 4, the punch tip member 2 has a substantially cylindrical shape, and has a distal end to be inserted into the die hole to compress a powdery material, as described above. Further, the punch tip member 2 has a proximal end provided with a supported portion 21 that is radially enlarged so as to be supported by the cap 4. The holder 3 is attached to the proximal end of the punch tip member 2 by means of the cap 4.

As shown in FIGS. 1, 2, 5, and 6, the holder 3 has a columnar holder body 31, a head 32, and a cap attaching portion 33. The head 32 is provided at a proximal end of the holder body 31 and is pressed by a roll (not shown). The cap attaching portion 33 is provided at a distal end of the holder body 31 and is smaller in diameter than the holder body 31. The cap attaching portion 33 has a substantially regular polygonal shape in bottom view, and more particularly, a substantially regular triangular shape. Further, apexes are chamfered along an arc coaxial with the axis of the holder body 31. The projection 3*a* is provided at each of three chamfered tips of the cap attaching portion 33 so as to project radially outward. The holder body 31 is provided, at the distal end thereof, with a rotation inhibiting member fitting groove 3*x* into which the rotation inhibiting member 5 is fitted. The rotation inhibiting member fitting groove 3*x* has a rectangular shape in cross section. Accordingly, the rotation inhibiting member fitting groove 3*x* has a bottom surface and side surfaces, all of which are planar. Further, the rotation inhibiting member fitting groove 3*x* has a proximal end provided with a finger fitting portion 3*y*, which is fitted with a finger for removing the rotation inhibiting member 5. The finger fitting portion 3*y* has a bottom surface flush with the bottom surface of the rotation inhibiting member fitting groove 3*x*. Further, as described earlier, the holder 3 and the punch tip member 2 are detachably connected with each other by means of the cap 4.

As shown in FIGS. 1, 2, 7, 8, and 9, the cap 4 is a hollow member in a substantially cylindrical shape. The cap 4 is provided with the punch tip retaining portion 41 at the distal end of the peripheral wall of the hollow portion, and this punch tip retaining portion 41 is abutted against the supported portion 21 of the punch tip member 2 to retain the same. Further, the cap 4 is provided, at the proximal end, with the opening 4*s* that allows the distal end of the holder 3, more particularly, the cap attaching portion 33 to be inserted thereinto. The opening 4*s* is provided, on the peripheral wall, with the receiving portion 4*s*1 that allows the projection 3*a* of the holder 3 to be inserted thereinto and extracted therefrom in the axial direction. The receiving portion 4*s*1 is a groove that enlarges the opening 4*s* in diameter and that extends in the axial direction. Moreover, as described earlier, the opening 4*s* is provided, on the peripheral wall, with the disengagement inhibiting portion 4*s*2 that is disposed adjacent to the receiving portion 4*s*1 in the circumferential direction and is engaged with the projection 3*a* of the holder 3, so as to inhibit the projection 3*a* from being inserted and extracted in the axial direction. In the present embodiment, the disengagement inhibiting portion 4*s*2 is disposed between the receiving portions 4*s*1 adjacent to each other in the circumferential direction. Further, the proximal end of the cap 4 is cut out in the axial direction to configure a rotation inhibiting member fitting concave portion 4*x*. The rotation inhibiting member 5 is detachably provided so as to inhibit relative rotation between the cap 4 and the holder 3.

As shown in FIGS. 1 and 2, while the punch 1 is in use, the rotation inhibiting member 5 is fitted in the rotation inhibiting member fitting groove 3*x* of the holder 3 as well as in the rotation inhibiting member fitting concave portion 4*x* of the cap 4. The rotation inhibiting member 5 is provided, at the distal end, with a retentive portion 51 for retaining the rotation inhibiting member 5 onto the peripheral wall of the cap 4 from the inner peripheral side. The configuration described above enables the rotation inhibiting member 5 to be easily attached and detached. Further, when the punch 1 is attached to the compression molding machine, the holder 3 and the rotation inhibiting member 5 of the punch 1 are retained by a punch retainer (not shown) of the compression molding machine. Therefore, even with use of such a simple configuration, the rotation inhibiting member 5 is not disengaged from the holder 3 in the state where the punch 1 is attached to the compression molding machine.

In the present embodiment, the punch 1 is assembled in the following manner, for example.

Initially, the projection 3*a* of the holder is abutted against a projection 2*a* of the punch tip member 2, and the receiving portion 4s1 of the cap 4 and the projections 2*a* and 3*a* are abutted one another in terms of topology. Then, in this state, the cap 4 is attached to the supported portion 21 and the cap attaching portion 33 with the opening 4*s* facing the supported portion 21 and the cap attaching portion 33. Thereafter, the cap 4 is rotated so as to engage the disengagement inhibiting portion 4*s*2 of the cap 4 with the projection 3*a* of the holder 3. The retentive portion 51 of the rotation inhibiting member 5 is inserted between the peripheral wall of the cap 4 and the cutout portion in the supported portion 21 of the punch tip member 2. The rotation inhibiting member 5 is fitted into the rotation inhibiting member fitting groove 3*x* of the holder 3 as well as into the rotation inhibiting member fitting concave portion 4*x* of the cap 4.

In the contrary, the punch 1 is disassembled in the following manner, for example.

Initially, a finger is fitted into the finger fitting portion 3*y* to pull out and remove the rotation inhibiting member 5 so as to be away from the cap 4 and the punch tip member 2 in the axial direction. Then, the cap 4 is rotated so as to cause the projection 3*a* of the holder 3 and the receiving portion 4*s*1 of the cap 4 to be abutted each other in terms of topology, whereby the cap 4 and the punch tip member 2 are extracted from the holder 3. Thereafter, the punch tip member 2 is extracted from the cap 4.

As described above, in the configuration according to the present embodiment, the projection 3*a* of the holder is abutted against the projection 2*a* of the punch tip member 2, the receiving portion 4*s*1 of the cap 4 and the projections 2*a* and 3*a* are abutted one another in terms of topology. In this state, the cap 4 is attached to the supported portion 21 and the cap attaching portion 33 with the opening 4*s* facing the supported portion 21 and the cap attaching portion 33. Thereafter, the cap 4 is rotated to engage the disengagement inhibiting portion 4*s*2 of the cap 4 with the projection 3*a* of the holder 3, whereby the cap 4 is attached to the holder 3. Accordingly, the punch tip member 2 can be attached to the distal end of the holder 3, while the punch tip member 2 can be detached from the distal end of the holder 3 in the reverse processes. Therefore, there needs no tool for attaching and detaching the cap 4. Further, the cap 4 does not need to be rotated more than one time for attaching the punch tip member 2 to the distal end of the holder 3. As a result, operation time necessary for attaching the punch tip member 2 to the holder 3 can be remarkably reduced, in comparison to a conventional case where the cap 4 needs to be rotated for several times for attaching and detaching the cap 4.

In particular, in the present embodiment, the three receiving portions 4*s*1 of the cap 4 and the three disengagement inhibiting portions 4*s*2 of the cap 4, as well as the three projections 3*a* of the holder 3, are disposed so as to be apart from one another in the circumferential direction, respectively, so that the cap 4 can be securely attached to the holder 3.

Further, the rotation inhibiting member 5 is engaged with the rotation inhibiting member fitting groove 3*x* provided in the holder 3 and the rotation inhibiting member fitting concave portion 4*x* provided in the cap 4, thereby restricting relative rotation between the cap 4 and the holder 3. The holder 3 and the cap 4 are thus reliably inhibited from rotating relatively to each other.

Moreover, the rotation inhibiting member 5 is provided, at the distal end, with the retentive portion 51 for retaining the rotation inhibiting member 5 onto the peripheral wall of the cap 4 from the inner peripheral side. It is therefore possible to effectively prevent the rotation inhibiting member 5 from being detached from the cap 4 and the holder 3.

It is noted that the present invention is not limited to the embodiment described above.

As an alternative example, the number of each of the receiving portions of the cap, the disengagement inhibiting portions of the cap, and the projections of the holder may be two or less, or four or more.

Further alternatively, relative rotation between the holder and the cap may be inhibited with use of other means such as a rotation inhibiting portion provided as described below. Specifically, the rotation inhibiting portion is configured by engagement between a projection and a locking concave portion. The projection is provided so as to project in the axial direction from one of the rotation inhibiting member and the holder, or from one of the rotation inhibiting member and the cap. The locking concave portion is provided on the other one of the above, so as to be engageable with the projection.

Furthermore, the punch tip member is not limited in shape to that of the embodiment described above. For example, the supported portion may be provided with two punch tip members.

Other than the above, the present invention may be modified in various ways as long as not affecting the purpose of the invention.

What is claimed is:

1. A punch of a compression molding machine for compressing and molding a powdery material filled in a die hole, the punch comprising:

a punch tip member inserted into the die hole, for compressing the powdery material in the die hole;

a holder having a distal end that is attached with the punch tip member and is provided with at least one projection projecting radially outward, the holder being driven to move forward and backward with respect to the die hole;

a cap having a punch tip retaining portion for retaining the punch tip member, an opening allowing the distal end of the holder to be inserted thereinto, a receiving portion allowing the projection of the holder to be inserted thereinto and extracted therefrom in an axial direction, and a disengagement inhibiting portion provided adjacent to the receiving portion in a circumferential direction so as to be engaged with the projection of the holder and to inhibit the projection from being inserted and extracted in the axial direction, the receiving portion and the disengagement inhibiting portion being provided on a peripheral wall of the opening; and a rotation inhibiting member engaged with the holder and the cap attached with the punch tip member so as to inhibit axial rotation of the cap relative to the holder.

2. The punch of a compression molding machine according to claim 1, the punch comprising three receiving portions of the cap, three disengagement inhibiting portions of the cap, and three projections of the holder, the receiving portions, the disengagement inhibiting portions, and the projections being configured identically with those of claim 1, respectively, and being disposed so as to be apart from one another in the circumferential direction.

3. The punch of a compression molding machine according to claim 1, wherein the rotation inhibiting member is engaged with a fitting groove provided in the holder and a rotation inhibiting member fitting concave portion provided in the cap, so as to restrict relative rotation between the cap and the holder.

4. The punch of a compression molding machine according to claim 3, wherein the rotation inhibiting member is provided, at a distal end thereof, with a retentive portion for retaining the rotation inhibiting member onto the peripheral wall of the cap from an inner peripheral side.

5. The punch of a compression molding machine according to claim 2, wherein the rotation inhibiting member is engaged with a fitting groove provided in the holder and a rotation inhibiting member fitting concave portion provided in the cap, so as to restrict relative rotation between the cap and the holder.

6. The punch of a compression molding machine according to claim 5, wherein the rotation inhibiting member is provided, at a distal end thereof, with a retentive portion for retaining the rotation inhibiting member onto the peripheral wall of the cap from an inner peripheral side.

* * * * *